(No Model.) 2 Sheets—Sheet 1.
H. E. HALL.
GREENHOUSE.
No. 519,766. Patented May 15, 1894.
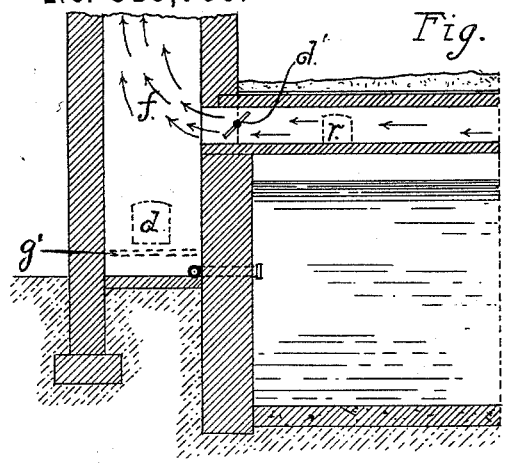
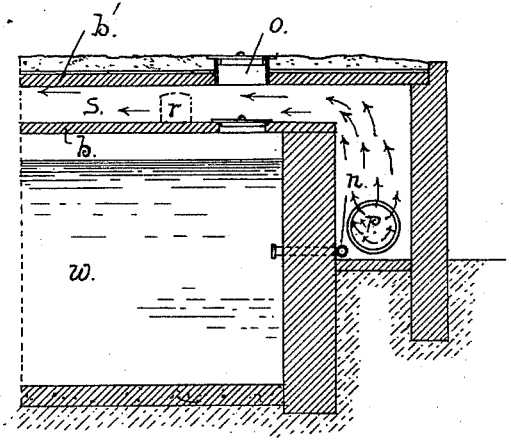
Fig. I.
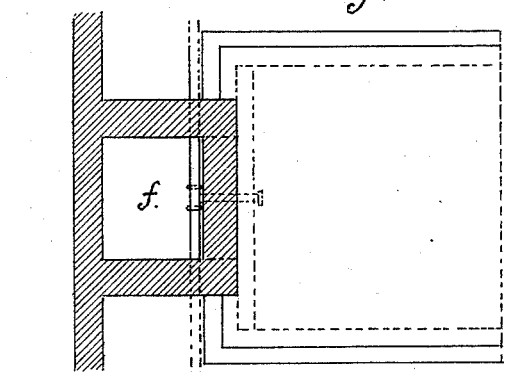
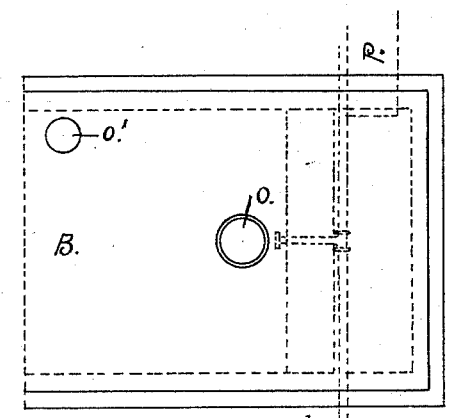
Fig. II.
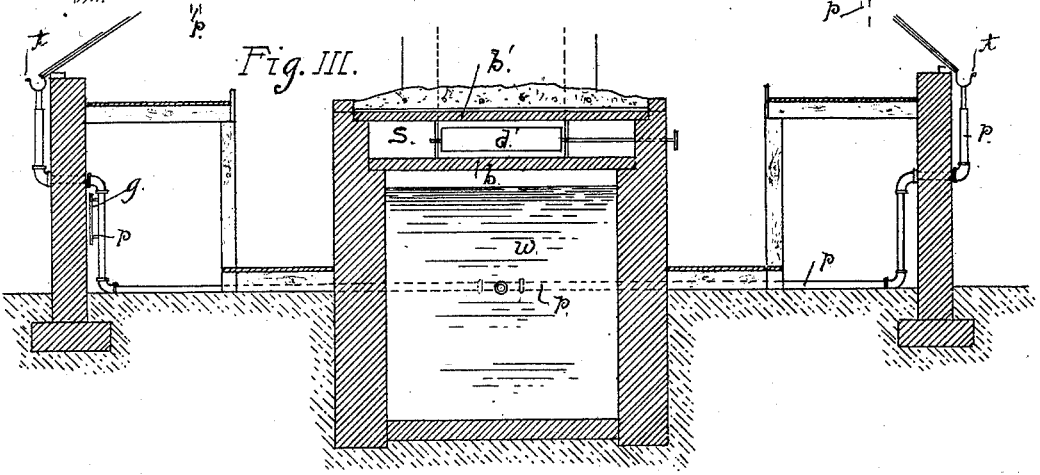
Fig. III.
Witnesses:
E. R. Chapman
David Murdoch
Inventor:
Henry E. Hall
Per L. D. Woodworth
Attorney (No Model.) 2 Sheets—Sheet 2.
H. E. HALL.
GREENHOUSE.
No. 519,766. Patented May 15, 1894.
Fig: IV.
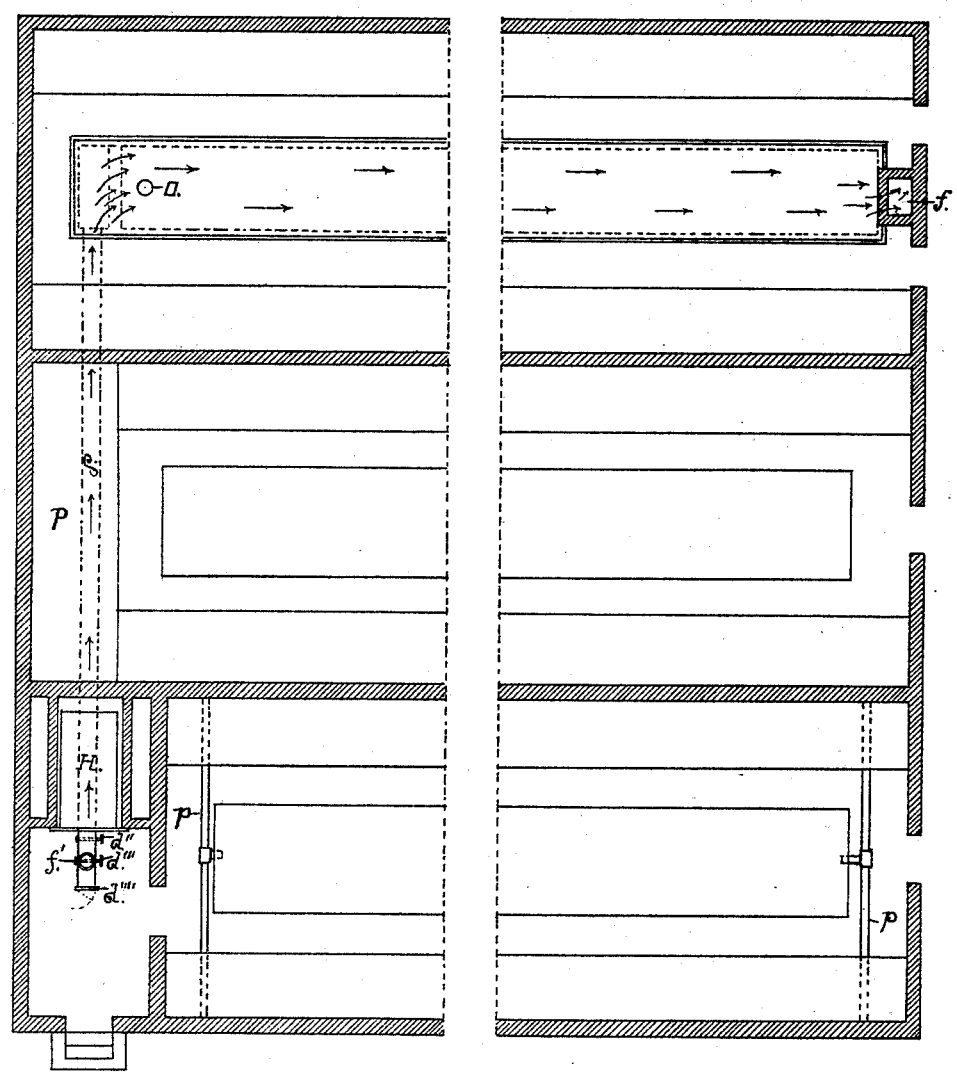
Witnesses:
E. R. Chapman
David Murdoch
Inventor:
Henry E. Hall
Per L. D. Woodworth
Attorney

UNITED STATES PATENT OFFICE.

HENRY E. HALL, OF YOUNGSTOWN, OHIO.

GREENHOUSE.

SPECIFICATION forming part of Letters Patent No. 519,766, dated May 15, 1894.

Application filed November 10, 1893. Serial No. 490,574. (No model.)

*To all whom it may concern:*

Be it known that I, HENRY E. HALL, a citizen of the United States, residing at Youngstown, in the county of Mahoning and State of Ohio, have invented certain new and useful Improvements in Greenhouses; and I do hereby declare the following to be a full, clear, and exact description of my invention, such as will enable others skilled in the art to which it appertains to make and use the same, reference being had to the accompanying drawings, which form part of this specification.

My invention relates to the general plan of greenhouses, and to the propagating benches and means of water and hot air supply and distribution therein, and it has for its object a greater economy and convenience in operation, and better results in the growth of plants and flowers than have hitherto been realized in such structures. I accomplish this object by the means hereinafter described, and illustrated in the drawings, in which—

Figure I is a vertical longitudinal view of my propagating bench B, and some of its connections. Fig. II is a top view of the same. Fig. III is a vertical cross sectional view of the same, and of the building wall, showing also the water connection. Fig. IV is a plan view in horizontal section of a green house showing a series of benches, some only of which are heated after the principles of the invention.

Each view, except the one at Fig. III, on account of proportions, the compartments and benches being very long and narrow, is cut through in the length center.

Parts are indicated by letters and similar letters refer to similar parts in all views.

In my green house I do not depart from the usual plan of a building and having several compartments, long and narrow, but of sufficient breadth for one central and two side benches.

While my invention relates solely to equipments and may be applied in one, more, or all of the compartments of a greenhouse as may be preferred, depending upon the situation and upon the species of plants to be propagated, I have illustrated it in the drawings applied only in one of the three compartments represented, for the purpose of showing that which I deem to be the best method of applying it when a portion only of the compartments of a green house are to be provided with it, for the greatest convenience and the highest economy in the utilization of heat.

The bench B is of the usual external appearance of greenhouse propagating benches. For convenience in height, without diminution of capacity, about one half its bulk is embedded in the ground. Interiorly the lower and much larger portion is occupied by the water cistern $w$, and the upper and much less portion vertically by the hot air chamber and conduit $s$. I make the floor $b$, and the cover $b'$, (on which is placed the mold,) of the hot air chamber $s$, which is in the extreme upper part of the bench, preferably, of flag stone because of its quality to hold and radiate heat, cementing the flags when laid so that they are air tight. I also carefully cement the sides and bottom of the cistern $w$, so that it is everywhere water tight. An outer vertical wall supports one end of the cover $b'$ forming a vertical portion to the hot air chamber $s$ which has a floor made in the manner of the floor $b$ and on a level with the floor of the building. At the other end of the bench I place the flue $f$ having the grate $g'$ and a combustion chamber provided with the door $d$, for a purpose that will appear in its proper place. At a convenient location near one side appears the opening $o'$ through the cover $b'$ and the floor $b$, for a pump, and through the same parts at a suitable location near the point of hot air entrance into the chamber $s$ appears the larger opening $o$ for a means of access to the air chamber and cistern. Both of the openings $o$ and $o'$ are provided with close fitting covers similar to those used for manholes. In the sides of the chamber $s$, at suitable intervals, are placed the openings $r$ provided with close fitting sliding doors for access to the hot air chamber $s$ for the purpose of clearing it of soot as may be required. A trifle inward from the point of hot air exit from the chamber $s$ into the flue $f$ the chamber $s$ is narrowed and the damper $d'$ is placed therein for a means of confining the hot air within the chamber $s$ when desirable.

The cistern $w$ is supplied with water by the pipe $p$, which outside of the compartment is connected with the eaves trough $t$, so as to receive water therefrom. It enters the building, preferably, at a point on a level with the top of the cistern *w*, deflects downward along the side of the compartment to the floor, and thence extends to an end of the cistern *w*. Both sides of the bench B and of the compartment are similarly equipped with the pipe *p*, the ends of the two pipes from the opposite sides being connected into a T, the main stem of which enters the cistern *w*. Preferably, for an abundant water supply, both ends of the bench are provided with a pipe *p* as described. A water gage *g* within the compartment in the upper part of the vertical portion of one of the pipes *p* is used to indicate the height of the water in the cistern *w*, while upon the outside of the compartment means is provided, preferably the disconnection of the pipe and the eaves trough, for shutting off the inflow of the water.

For warming, any form of furnace or any heating device may be employed, and either steam, or hot water, or hot air, may be the agent. I prefer the Hitchings heater, and the use of hot air. The heater H is placed in a room at one end of one of the outer compartments and from this the hot air is conveyed in the large pipe P which runs parallel with the end wall of the building to the farther compartment occupied by a bench B where it enters the hot air chamber *s* in its vertical part. To regulate the flow of hot air in the pipe P and the chamber *s* I place the damper $d''$ in the pipe P near the point where it receives hot air so that the air flow may be checked or wholly shut off; the damper $d'''$ in the flue $f'$, which is connected with the pipe P, so that heat may be shut off from escape through the flue $f'$ and forced into the pipe P; and the damper $d''''$ in the end of the pipe so that cool air may be allowed to enter when desirable.

If steam or hot water is used a suitable steam or hot water pipe must be provided in place of the pipe P, in which case the pipe is continued through the chamber *s*, and may be placed therein in radiator form. Between the heater H and the bench B the pipe P is incased in suitable chambers beneath benches that are transverse to the compartments to utilize the heat radiating therefrom.

To exhaust the cold air in the chamber *s* of the bench B and in the pipe P, upon starting hot air therethrough I place a fire in the grate *g* of the flue *f*.

My invention will now be understood and its value appreciated as accomplishing the object stated.

In the matter of water whatever falls upon the slopes of the compartment roof flows, without labor or attention, into the cistern *w*, where, by means of the radiation of heat from the floor *b* of the hot air chamber *s*, its temperature is raised to the point best adapted for use in plant watering.

In the matter of heat, when the length of the pipe P and of the warm air chamber *s* is considered, together with the means that have been described for regulating the flow of hot air, it will be seen that but little if any of the heat entering the pipe P is lost, the same being utilized in a greater degree than heretofore in green houses.

I expressly disclaim invention in any part of the means shown and described, except in the bench B, and in the construction and arrangement of the water and hot air pipes.

What I claim is—

1. In green houses the rectangular bench B, at one end provided with flue *f* in which appears a grate, and having, in its upper and lesser portion and in the end opposite the flue *f*, the hot air chamber *s* connected with a means for introducing heat, and in its lower and larger portion the water cistern *w* connected with water pipes, the air chamber *s* exhibiting in its floor *b* and cover *b'* the openings *o* and *o'*, and in its sides a series of the apertures *r* having doors, and provided with the damper *d'* near the flue *f*, substantially as described and for the purpose expressed.

2. In green-houses, the green house equipment consisting, in combination, of the hot air pipe P extending from the furnace H to and entering the hot air chamber *s* of the bench B; the water pipe *p* connected with the eaves trough *t* and extending through the compartment wall to and entering the cistern *w* of the bench B; and the rectangular bench B, at one end provided with the flue *f* in which appears a grate, and having in its upper and lesser portion, and at the end opposite the flue *f*, the hot air chamber *s*, and in its lower and larger portion the water cistern *w*; the air chamber *s* exhibiting in its floor *b* and its cover *b'*, the openings *o* and *o'*, and in its sides a series of the apertures *r* having doors, and provided with the damper *d'* near the flue *f*, substantially as described and for the purpose expressed.

In testimony whereof I hereunto affix my signature in the presence of two witnesses.

HENRY E. HALL.

Witnesses:
E. H. TURNER,
J. G. VETTER, Jr.